United States Patent [19]

Stackhouse et al.

[11] 4,001,693
[45] Jan. 4, 1977

[54] APPARATUS FOR ESTABLISHING COMMUNICATION BETWEEN A FIRST RADIO TRANSMITTER AND RECEIVER AND A SECOND RADIO TRANSMITTER AND RECEIVER

[75] Inventors: Bill L. Stackhouse; Theodore E. Taylor, both of Lynchburg, Va.

[73] Assignee: General Electric Company, Lynchburg, Va.

[22] Filed: May 12, 1975

[21] Appl. No.: 576,801

[52] U.S. Cl. .................................. 325/58; 178/69.1
[51] Int. Cl.² .......................................... H04L 7/00
[58] Field of Search ............... 325/5, 51, 4, 53, 54, 325/55, 58, 64, 302; 343/179; 178/69.5 R; 179/15 BS, 41 A; 340/147 SY; 328/63

[56] References Cited

UNITED STATES PATENTS

| | | | |
|---|---|---|---|
| 3,418,579 | 12/1968 | Hultberg | 325/58 |
| 3,532,985 | 10/1970 | Glomb et al. | 325/58 |
| 3,646,580 | 2/1972 | Fuller et al. | 325/58 |
| 3,725,787 | 4/1973 | Featherston | 325/58 |
| 3,808,367 | 4/1974 | Wigner et al. | 178/69.5 R |

OTHER PUBLICATIONS

Booklet Entitled "Ge-Marc 900 An Example of MUPDS," General Electric Company, Jan. 1974.

*Primary Examiner*—Robert L. Richardson
*Assistant Examiner*—Jin F. Ng
*Attorney, Agent, or Firm*—James J. Williams

[57] ABSTRACT

In a radio communication system having a command or base station and one or more controlled or mobile stations, the base station continuously transmits outbound function messages in binary bit form to the mobile stations. Each outbound function message comprises a sequence of binary bits forming a first synchronizing word, a first address word transmitted three times, a second inverted synchronizing word, a second address word transmitted three times, a third inverted synchronizing word, and a command word transmitted three times. All mobile stations receive the outbound messages and synchronize on them, but only that mobile station whose address is transmitted responds. Each mobile station is synchronized when it properly receives two consecutive synchronizing words in sequence, and remains in synchronization unless five consecutive synchronizing word errors occur. The response from the mobile station to the base station is an inbound message also in binary bit form. Each inbound message comprises a preamble followed by the first synchronizing word, the first address word transmitted three times, the second inverted synchronizing word, the second address word transmitted three times, the third inverted synchronizing word, and a response word transmitted three times. This inbound message or response has a bit rate that is 1½ times the outbound message bit rate so that other mobiles can respond to their respective messages as they are transmitted by the base station. The base station anticipates each inbound message and uses the preamble and the first synchronizing word to synchronize itself with the inbound message. Thus, high speed binary function controls are reliably provided between a base station and one or more mobile stations in the environment of radio frequencies, particularly those in the land mobile service.

17 Claims, 14 Drawing Figures

FIG.4 OUTBOUND MESSAGE FORMAT

INBOUND MESSAGE FORMAT

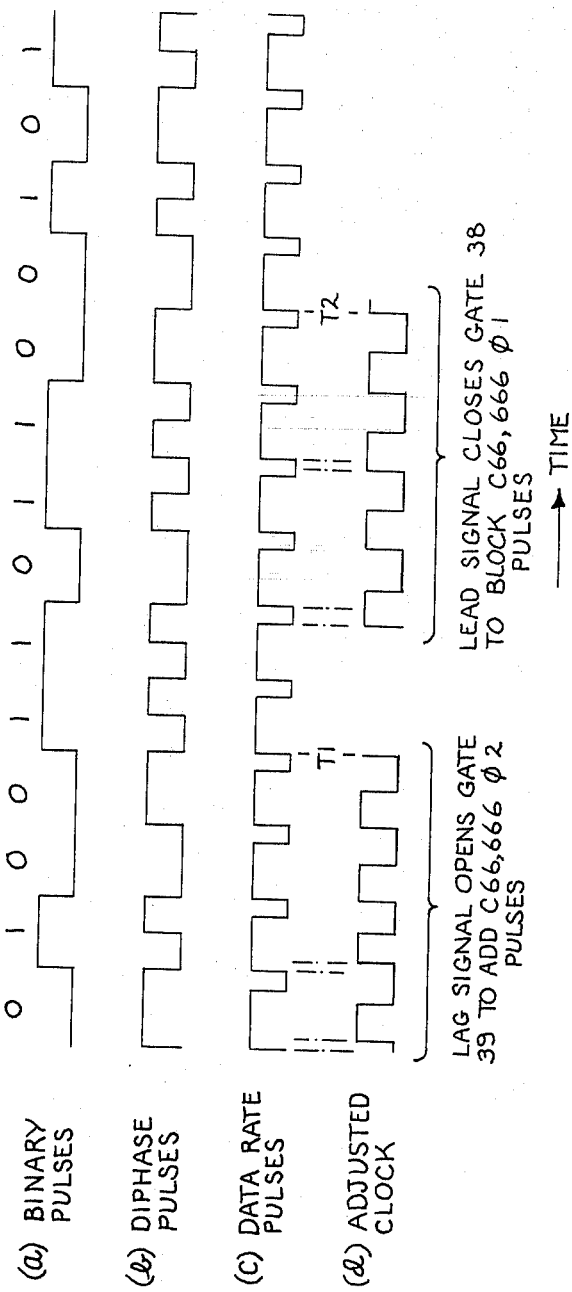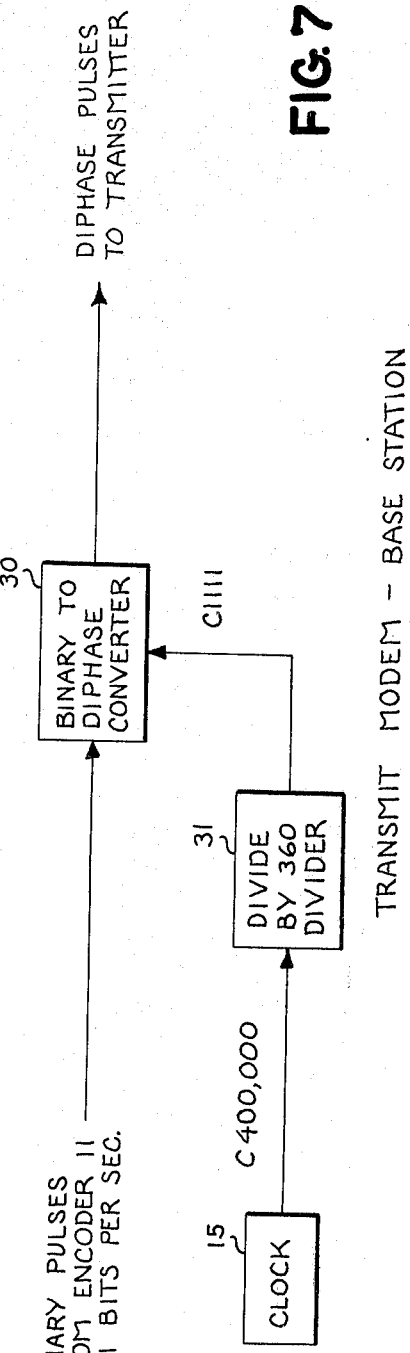

APPARATUS FOR ESTABLISHING COMMUNICATION BETWEEN A FIRST RADIO TRANSMITTER AND RECEIVER AND A SECOND RADIO TRANSMITTER AND RECEIVER

CROSS REFERENCES TO RELATED APPLICATIONS

This application is related to the following copending applications:

Ser. No. 576,279, entitled "Apparatus for Indicating Synchronization and Out-of-Synchronization Conditions", filed May 12, 1975;

Ser. No. 576,383, entitled "Message Generator for a Controlled Radio Transmitter and Receiver", filed May 12, 1975;

Ser. No. 576,548, entitled "Apparatus for Indicating Synchronization of a Radio Receiver With a Radio Transmitter", filed May 12, 1975, now abandoned;

Ser. No. 576,873, entitled "Diphase to Binary Converter", filed May 12, 1975, now abandoned.

BACKGROUND OF THE INVENTION

Our invention relates to function control apparatus, and particularly to function control apparatus that is adapted to be used in a radio communication system and that uses binary bits or pulses to indicate the desired functions and responses.

Radio communication systems, particularly those having a command or base station and one or more mobile stations, are expected to provide many functions over and above the simple call and answer voice communication, and are expected to establish voice communication quickly and reliably on one of several frequencies or channels. An example of the provided function is where a base station needs to determine the status or condition of a particular mobile station in the system. An example of establishing voice communication is where one of several radio frequencies or channels is to be used for voice communication in a given system, such as public safety or in industry.

Accordingly, a primary object of our invention is to provide novel function control apparatus that is particularly adapted to be used in a radio communication system.

Another object of our invention is to provide new function control apparatus for use in two-way radios operating in the land mobile service.

Another primary object of our invention is to provide apparatus, for use with radio communication systems, that can obtain information from a station in such a system or that can cause a station in such a system to switch to selected transmitting and receiving frequencies.

In function control apparatus as described thus far, speed and reliability are important, particularly when the apparatus is used with radio systems at frequencies which are crowded and subject to noise or fading. While there is such function control apparatus available, its speed and reliability are not as high as some users require or prefer.

Accordingly, another object of our invention is to provide novel function control apparatus for a radio communication system that provides relatively high speed operation in a reliable manner, even over the intended radio frequencies.

SUMMARY OF THE INVENTION

Briefly, these and other objects are achieved in accordance with our invention by function control apparatus provided at each station in a radio communication system. A base station usually serves as a command station, and transmits outbound messages in binary bit form. Each outbound message comprises a first synchronizing word, a first address word transmitted three times, a second inverted synchronizing word, a second address word transmitted three times, a third inverted synchronizing word, and a command word transmitted three times. These outbound messages are transmitted continuously and consecutively, each outbound message being addressed through its first and second words to a particular mobile station, or all mobile stations. The command word indicates the function desired of the addressed mobile station. This function may be a request for status or condition, or may be an invitation for the mobile station to indicate that it desires to transmit to either the base station or another mobile station. As each mobile station receives the outbound messages, it synchronizes on the outbound messages, but only responds if its address is recognized in the first and second address words of a particular message. If its address is recognized, the mobile station responds by sending a somewhat similar inbound message in binary bit form. Each inbound message comprises a preamble, the same first synchronizing word, the same first address word transmitted three times, the same second inverted synchronizing word, the same second address word transmitted three times, the same third inverted synchronizing word, and a response word transmitted three times. This response word indicates that the mobile station is answering the inquiry, either as to its status or condition, or that it wishes to transmit on a frequency. If the mobile station does desire to transmit, the base station will then send another outbound message to that mobile station to set up or establish the desired communication. The inbound response from the mobile station to the base station has a bit rate that is 1½ times the bit rate of the outbound message rate, so that other mobile stations can respond to their outbound messages as received. The base station anticipates each inbound message and uses the inbound message preamble and the first synchronizing word to synchronize the base station with the inbound message. Thus, high speed binary function controls are reliably provided between a base station and a mobile station in the environment of radio frequencies, particularly those of the land mobile service.

BRIEF DESCRIPTION OF THE DRAWING

The subject matter which we regard as our invention is particularly pointed out and distinctly claimed in the claims. The structure and operation of our invention, together with further objects and advantages, may be better understood from the following description given in connection with the accompanying drawing, in which:

FIGS. 6a through 6d show wave forms illustrating certain pulses and their manipulation in the operation of function control apparatus in accordance with our invention;

FIG. 7 shows a more detailed schematic block diagram of the transmit modem of our function control apparatus of FIG. 2;

DESCRIPTION OF PREFERRED EMBODIMENTS

Introduction

In the following description, we will first give a general description of a radio communication system having function control apparatus utilizing our invention. Then, we will give a more detailed description of the function control apparatus and our inventions in that apparatus.

GENERAL DESCRIPTION

Figure 1:
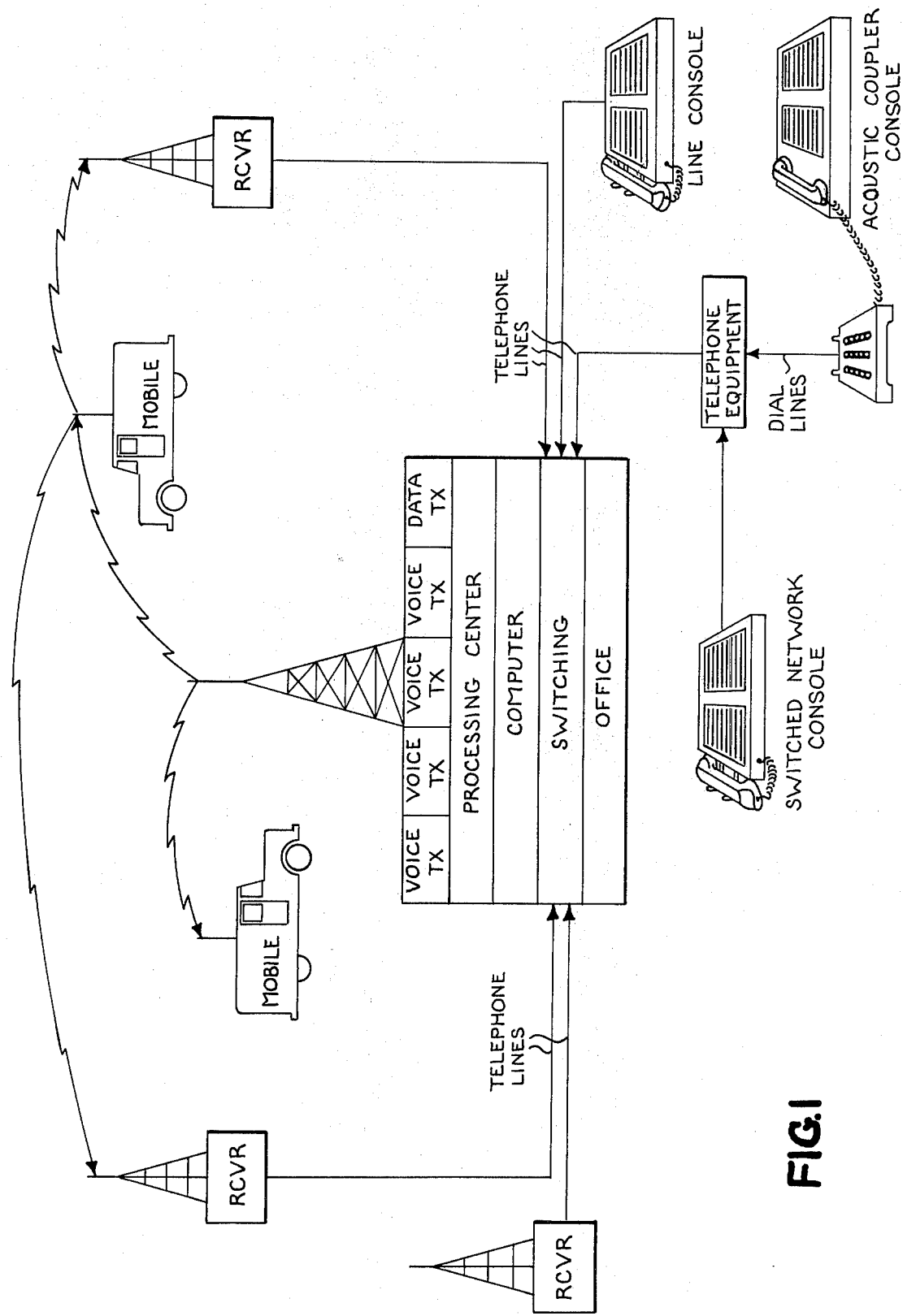
FIG. 1 shows a diagram illustrating an example of a radio communication system utilizing function control apparatus in accordance with our invention.

FIG. 1 shows an example of a radio communication system having function control apparatus utilizing our invention. In the example of FIG. 1, it is desirable that relatively efficient use be made of the radio spectrum when communicating between a fixed command or base station and one or more controlled or mobile stations, or when communicating between mobile stations. The base station may be connected by telephone lines to other user locations in order to permit those other locations to connect with the radio transmitter and receiver at the base station for communication with the mobile stations. While only one base station, two mobile stations, and three user telephones are shown, our apparatus can be used with more or less such stations or users. Because the mobile station transmitters are, usually, of lower power than the base station transmitter, satellite radio receivers may be strategically located so as to pick up transmitted signals from the mobile station transmitters and supply those signals over telephone lines to the base station. In order that communication can be established and completed more efficiently between a base station and one or more mobile stations or between mobile stations, we have provided function control apparatus for use with the radio communication system. Our function control apparatus utilizes relatively high speed binary or digital signals to establish the desired communication, or to obtain information, or to indicate a status condition. Where there are a relatively large number of radio frequency channels available for communication, we prefer that a single channel be dedicated for the transmission of this binary or digital information. However, it is to be understood that the binary or digital information can be transmitted and received on the same radio frequencies used for the voice communication. The base station is shown with a data transmitter and several voice transmitters. The receivers must be able to receive on the dedicated channel, if used, and the voice channels. The binary or digital information transmitted is used to provide a control function, such as the establishment of desired communication between the base station and a mobile station, or between two mobile stations, or to obtain information.

An example of the establishment of communication between the base station and a mobile station is where a person at a fixed location connected to the base station by a telephone line desires to communicate with a mobile station. That person can dial an appropriate number to the base station. The base station computer than processes (including recording if desired) the information represented by the dialed number, provides switching, and transmits appropriate binary or digital information over either the dedicated channel or the voice channel to the desired mobile station. If the mobile station receives the transmission and is available, the mobile station transmits a response using binary or digital information. The base station then directs the mobile station to begin communication with the person at the fixed location either on the frequency used to establish the communication, or on some frequency directed by the base station. In a similar manner, the base station can receive a response from a mobile station and establish communication between that mobile station and some other station, either mobile or a user through the base station.

An example of indicating status or other condition is where a person at the base station wishes to know whether a mobile station is in operation, or is in some other condition. Such applications are common in police forces where a central dispatcher wishes to know the status or condition of one or more of his mobile police stations. In such a case, the dispatcher can send out an appropriate inquiry identifying the particular mobile station, and the mobile station can, totally unknown to the mobile police officer, send out a reply indicating that the mobile station is in service and awaiting messages, or that the mobile station is in some other condition, such as off duty or unavailable.

The two relatively specific examples given above will suggest many other uses and applications. Generally, the function control apparatus of our invention can be used in many different types of radio communication systems and for many different purposes in such systems, such purposes including without limitation the establishment of communication between two stations on a radio frequency, or the inquiry as to the situation or condition in a distant station.

Figure 2:
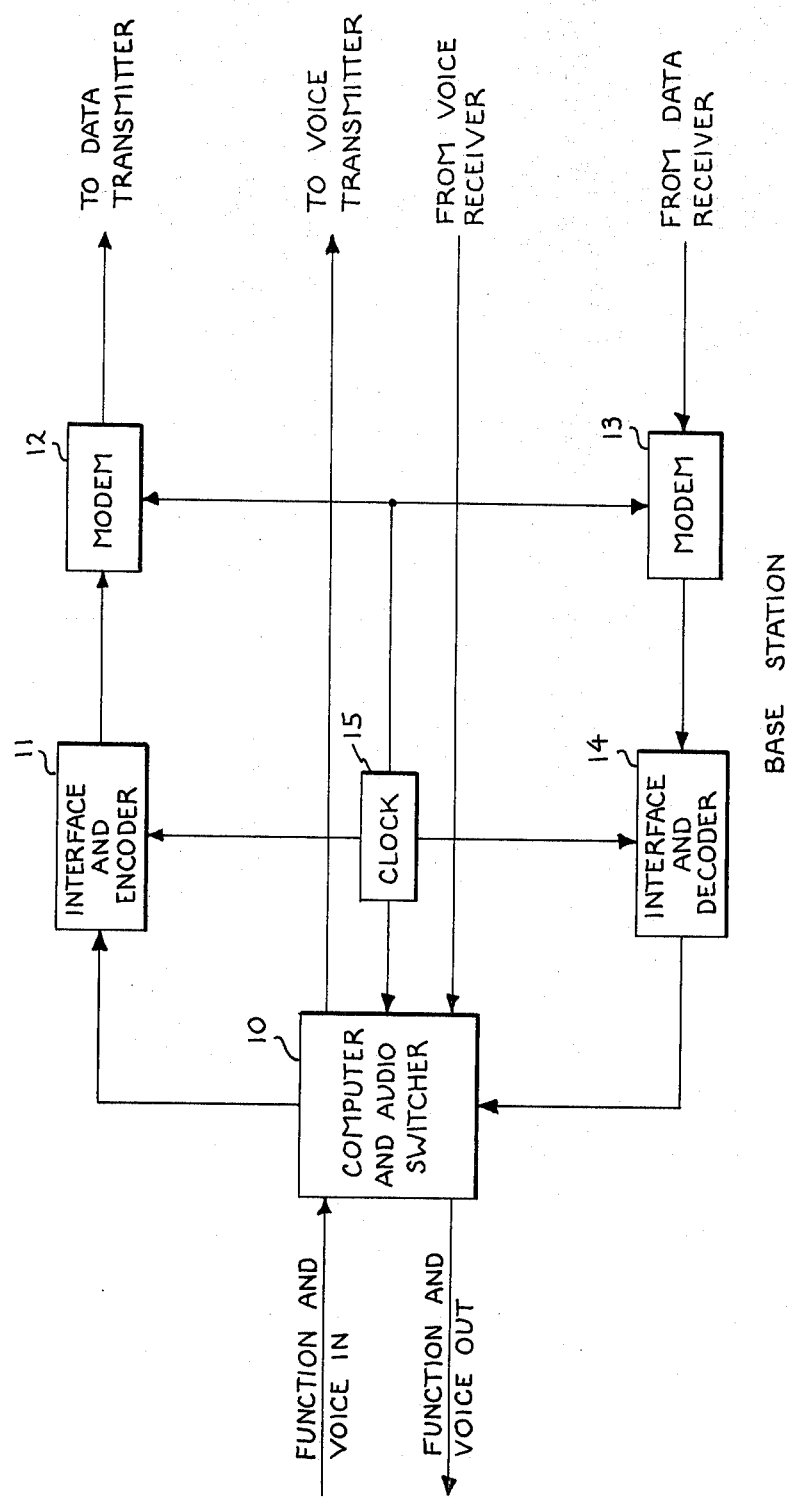
FIG. 2 shows a schematic block diagram of a base station function control apparatus in accordance with our invention.

FIG. 2 shows a block diagram of function control apparatus in accordance with our invention for use in a base station of a radio communication system. Functions and voice signals from either the base station or a telephone line are applied to a computer and audio switcher 10. If the base station utilizes a separate frequency for the function signals and a separate frequency for the voice signals, the computer 10 switches the function signals to an interface and encoder circuit 11. The interface portion makes whatever conversion may be needed to provide the proper electrical relations between the computer 10 and the encoder 11. The encoder 11 converts the function instructions received from the computer 10 to the desired format in accordance with our invention, and then supplies this format to a modem 12 for transmission by the base station data transmitter. After communication is established, if voice communication is provided, then the audio switcher 10 connects the voice input to the voice transmitter. Signals from the data receiver are applied to a modem 13 which converts the received signals to binary signals for application to an interface and decoder circuit 14. The decoder circuit 14 with the interface circuit converts the binary information into the proper language for the computer 10. The indicated functions are supplied, and after communication is established, if voice communication is provided, the voice receiver is connected to the appropriate lines for a voice output signal. A frequency stable clock or oscillator circuit 15 provides timing signals for the various components at the base station.

Figure 3:
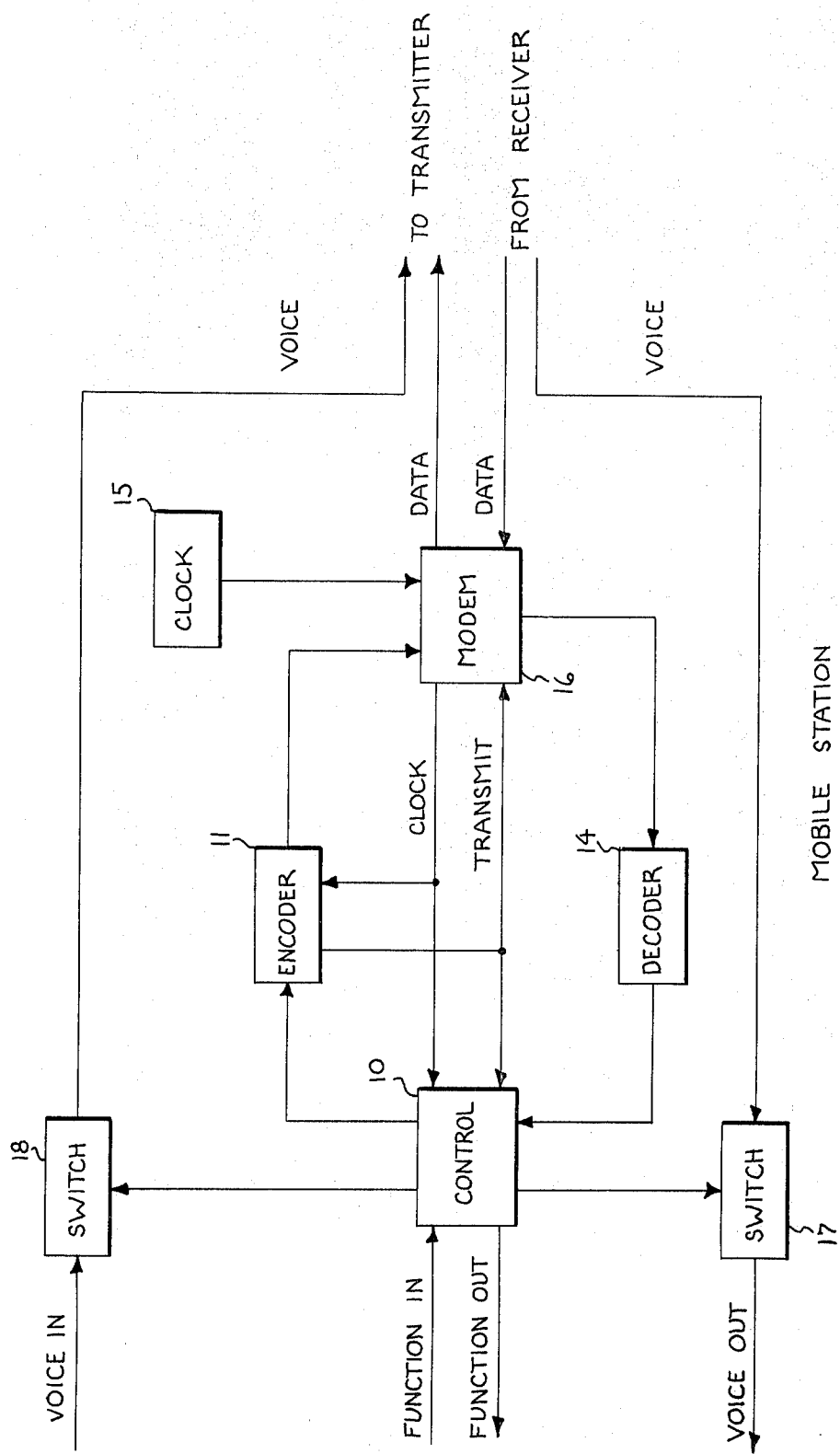
FIG. 3 shows a schematic block diagram of a mobile station function control apparatus in accordance with our invention.

FIG. 3 shows a block diagram of function control apparatus in accordance with our invention for use in a mobile station of a radio communication system. The diagram of FIG. 3 is similar to that of FIG. 2. However, because a mobile station typically has only one transmitter and one receiver, the data information must be transmitted and received by the same transmitter and receiver used for voice communication. Typically, a mobile station does not transmit when it is receiving, and does not receive when it is transmitting, so that a single modem 16 can be used. Received data signals are applied to the modem 16, and then decoded by a decoder 14 which may be similar to the decoder 14 for the base station. Signals from the decoder 14 are applied to a control 10 which generally provides the same functions as the computer and audio switcher 10 in FIG. 2. The data signals so received are utilized at the mobile station in any way desired, such as establishing a communication channel, or requesting information from the mobile station. If the data signals are used to establish voice communication, a switch 17 connects voice signals from the receiver to an appropriate output such as a loudspeaker. In the other direction, data signals are applied to the control 10 and encoded by an encoder 11 which may be similar to the encoder 11 of FIG. 2. These encoded signals are applied to the modem 16 and transmitted as data signals. If information has been requested from the mobile station, these data signals indicate the status or desired information. If the function control is used to establish communication, the control 10 operates the switch 18 to connect voice signals to the mobile station transmitter. And as in the base of the base station, a frequency stable clock or oscillator circuit 15 provides the necessary timing signals for the mobile station.

Figure 4:
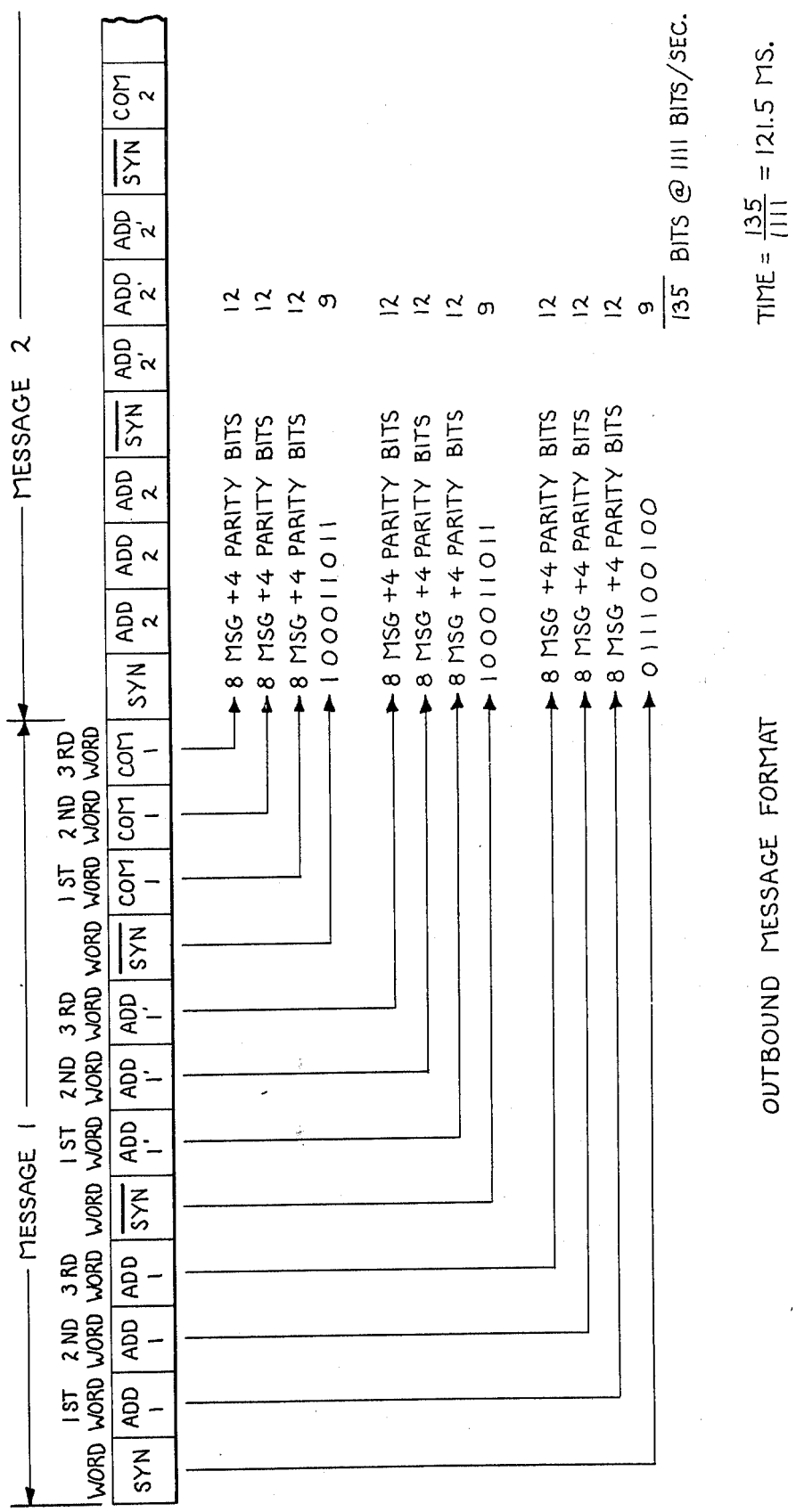
FIG. 4 shows the outbound message format used in the function control apparatus in accordance with our invention.

In order that our function control apparatus can be used in various applications such as establishing communication channels or requesting information, and in order that our function control apparatus can be used in the relatively noisy and sometimes unreliable radio frequency environment, we developed a function message control format to meet those requirements and still give reliable transmission of data at a relatively rapid rate. FIG. 4 shows the format of the function control messages used for transmission from a base station to a mobile station. The base station may and preferably does transmit messages continuously and sequentially, so that message 2 is shown immediately following message 1. Subsequent outbound messages would follow immediately, each outbound message having the same format but having unique or particular address and command words depending on the station to which the message is addressed and the function or inquiry desired. If the function control apparatus is to provide communication between the stations in a radio communication system, the base station may send a message addressed to each mobile station in a sequence, the message inquiring whether the mobile station desires to communicate. The sequence can, of course, be repeated continuously. Or, the base station can send an address to all mobile stations. When its addressed message is received, a mobile station can respond to the inquiry by sending a message (to be described) indicating that the mobile station does or does not desire to communicate. If the function control apparatus is to obtain information, the base station may send a message addressed to a mobile station, the message inquiring as to information about or status of the mobile station. When its addressed message is received, the mobile station can respond to the inquiry by sending a message (to be described) that answers the inquiry. The messages comprise binary or digital bits in a train or sequence. Message 1 is representative of the format of all outbound messages, and comprises, from left to right in time sequence, a synchronizing word (abbreviated SYN), a first address word (abbreviated ADD.1) which is produced a total of three times, a logic inverted synchronizing word (abbreviated SYN), a second address word (abbreviated ADD.1') which is produced a total of three times, a second inverted synchronizing word (abbreviated SYN), and a command word (abbreviated COM.1) which is produced a total of three times. The binary or digital makeup of each address and command word comprises 8 message and 4 parity bits as indicated by the arrows leading from the words. It will be seen that each message has a total of 135 binary bits. The SYN word comprises nine binary bits 011100100, which will be recognized as a seven bit Barker code having a prefix O and a suffix O. The SYN word is, of course, the logic inversion of this. The Barker code also includes the reverse sequence which, with the added prefix O and suffix O, is 001001110. This sequence may serve as the SYN word, and the SYN word is the logic inversion of this. Hence, as used in this application, the Barker code with prefix and suffix zeros may be 011100100 or 001001110. And of course, persons skilled in the art will appreciate that logic ones and zeros may be interchanged, since they refer to two binary levels, and not to a rigid voltage polarity or magnitude. Each of the address and command words comprises eight message bits and four parity bits whose generator polynomial is $X^4 + X + 1$. The generator matrix is:

$$G = \begin{bmatrix} 1 & 0 & 0 & 0 & 0 & 0 & 0 & 0 & 1 & 1 & 1 & 0 \\ 0 & 1 & 0 & 0 & 0 & 0 & 0 & 0 & 0 & 1 & 1 & 1 \\ 0 & 0 & 1 & 0 & 0 & 0 & 0 & 0 & 1 & 0 & 1 & 0 \\ 0 & 0 & 0 & 1 & 0 & 0 & 0 & 0 & 0 & 1 & 0 & 1 \\ 0 & 0 & 0 & 0 & 1 & 0 & 0 & 0 & 1 & 0 & 1 & 1 \\ 0 & 0 & 0 & 0 & 0 & 1 & 0 & 0 & 1 & 1 & 0 & 0 \\ 0 & 0 & 0 & 0 & 0 & 0 & 1 & 0 & 0 & 1 & 1 & 0 \\ 0 & 0 & 0 & 0 & 0 & 0 & 0 & 1 & 0 & 0 & 1 & 1 \end{bmatrix}$$

The parity check matrix is:

$$H = \begin{bmatrix} 1 & 0 & 1 & 0 & 1 & 1 & 0 & 0 & 1 & 0 & 0 & 0 \\ 1 & 1 & 0 & 1 & 0 & 1 & 1 & 0 & 0 & 1 & 0 & 0 \\ 1 & 1 & 1 & 0 & 1 & 0 & 1 & 1 & 0 & 0 & 1 & 0 \\ 0 & 1 & 0 & 1 & 1 & 0 & 0 & 1 & 0 & 0 & 0 & 1 \end{bmatrix}$$

We have selected a bit rate of approximately 1111 bits per second, so that each message requires approximately 121.5 milliseconds. While other message formats and other bit rates are possible, we prefer those described above and shown in FIG. 4.

Figure 5:
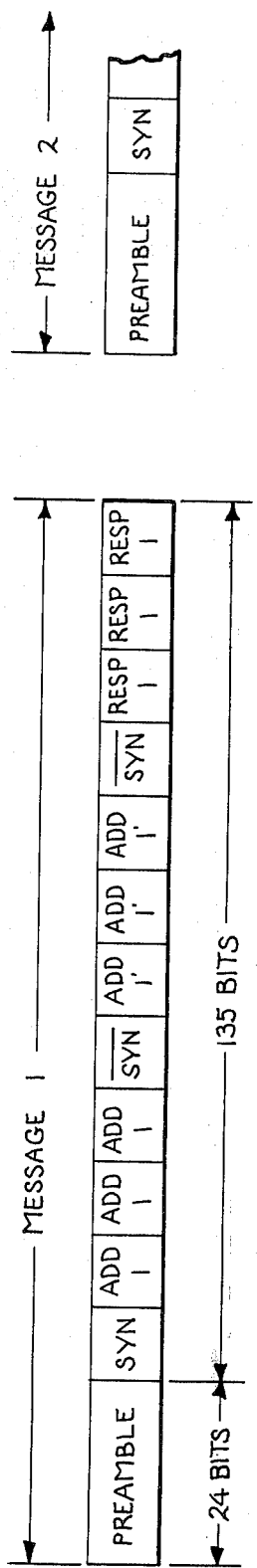
FIG. 5 shows the inbound message format used in the function control apparatus in accordance with our invention.

Since a typical application of our function control apparatus transmits outbound messages continuously, it is relatively easy for the function control in a mobile receiver to synchronize with the transmitted outbound message even though the message is not addressed to that receiver. On inbound messages, however, a mobile station generally does not transmit continuously, so that the base station has less opportunity to synchronize with an inbound message. Accordingly, as shown in FIG. 5, we provide our inbound message format with a binary preamble ahead of the 135 binary bits that provide synchronization, addresses, and responses. In a preferred embodiment, this preamble comprises 24 bits of alternate ones and zeros. However, other preambles may be used. In the inbound message, the 135 bits are substantially the same as the 135 bits in the outbound message format. Thus, we prefer that the ADD.1 and ADD.1' words (three times each) be identical to the outbound ADD.1 and ADD.1' words, and that the response word RESP.1 (produced three times) be partly similar to the command word, and partly different to indicate the response to that command or question. However, this is a matter of choice and preference, depending upon the application and environment. Since the mobile station transmits a longer message and requires some time to respond to an address and command, we provide a time interval between mobile inbound messages. Accordingly, the total of binary 159 bits in our inbound message format are transmitted approximately 1½ times faster than the outbound bits, or 1666 bits per second. Hence an inbound message requires 95.2 milliseconds, which leaves a time of 26.3 milliseconds between inbound messages. This time period of 26.3 milliseconds is adequate and desirable in order to compensate for any delays or responses of the mobile stations.

If a base station sends a message 1 to a given mobile station, its outbound message format will comprise the synchronizing word 01110100, followed by an address word for the mobile station transmitted a total of three times. Then the inverted synchronizing code word 10001 1011 is sent, followed by a second address word for the mobile station transmitted a total of three times. Then, the inverted synchronizing word 100011011 is sent followed by the command word transmitted a total of three times. The given mobile station responds to its address words and command word by sending its inbound message having a preamble (preferably having 24 bits of alternate zeros and ones) to enable the base station to bit synchronize with the inbound message. This is necessary because an inbound message will not be repeated until a subsequent outbound message addressed for the given mobile is received. After the preamble, the inbound message has the synchronizing word 011100100 followed by an address word transmitted a total of three times, the inverted synchronizing word, the second address word transmitted a total of three times, the inverted synchronizing word, and finally the response transmitted a total of three times. And as mentioned earlier, this inbound message bit rate is 1½ times faster than the outbound message bit rate, namely 1666 bits per second. Thus, the inbound message only requires 95.2 milliseconds, leaving a 26.3 milliseconds space for the next message from a mobile station. Of course, while the given mobile station is transmitting its message 1, the base station may be transmitting its message 2 to another mobile station. However, the given mobile station generally will have its receiver disconnected from the antenna when its transmitter is operating. Hence, message 2 should not be addressed to the same given mobile station, but should be for a different mobile station.

The triple transmission of each address word ADD.1, each address word ADD.1', and each command word COM.1 or response word RESP.1 was provided because of the nature of radio communication. Such communication is subject to impulse noise and fading because of bridges, buildings, and other objects. Hence, the triple transmission provides added assurance that the message will be received. When a message is received, and the receiving station is in synchronization with the message, corresponding bits of each repeated word are stored, and the majority of similar bits (that is 2 or more of the 3 corresponding bits) is selected by a digital or logic voting process. Thus, if the first bit of the first and second words of ADD.1 are a logic 1 but the first bit of the third word of ADD.1 is a logic 0, then our system selects the majority and decides that the first bit of ADD.1 is properly a logic 1. The remainder of the bits of each word are correspondingly selected, and after such selection, the selected bits are combined and utilized as the proper logic sequence of bits. As for synchronization, we assume that if, in a given message, the synchronizing word SYN and the logic inverted synchronizing word SYN are received in sequence, then the receiving mobile station is in message synchronization with the transmitting base station. The mobile station is considered to remain in synchronization until five sequential synchronizing words are incorrectly received. This is possible because the mobile station is constantly receiving messages from the base station. At the base station, however, a mobile only transmits its inbound message one time in response to an outbound message, so that the base station must synchronize on that one inbound message if at all possible. Hence, we have provided the inbound message preamble which aids bit synchronization, and alerts the base station to an inbound message. The base station then attempts to message synchronize on the remainder of the inbound message, and considers a message properly received if it receives the first synchronizing word SYN properly.

From this general description of our function control apparatus, it will be seen that we prefer that only a base or central station transmit addressed messages inquiring from or directing mobile stations in a communication system. Each mobile station in the system responds only to messages addressed to that mobile station (or to an all-station message), such response being any desired function such as switching to a communication frequency or indicating a status or condition. However, we contemplate that other stations (base or mobile) in a communications system may have the ability to send the inquiring or directing messages if desired.

DETAILED DESCRIPTION — COMPUTER AND AUDIO SWITCHING; CONTROL

We have not shown a more detailed diagram of the computer and audio switcher 10 of FIG. 2 or the control 10 of FIG. 3 since such devices are known and may take many different forms, depending upon the features and arrangements desired in the function control apparatus. It is for this reason that the computer and control have been given the same reference numeral 10. In the base station, the designated block 10 has been called a computer because it may have to hold more information and perform more functions than it would in a mobile station. Both the computer and control 10 store addresses and commands or responses which have a predetermined code, and which are looked up and produced in response to a relatively simple signal. For example, if a user requests his base station to connect him with a designated mobile station, he may send a simple signal that means call mobile station 1. The computer 10 would look up the address of mobile station 1 and prepare the designated code for mobile station 1 and send it through the interface and encoder 11 and the modem 12 to the data transmitter. All mobile stations may receive the transmitted message, and those that do receive the message compare its address with the stored mobile address. We prefer that each mobile station have a unique address, so that only one mobile station acts on a particular message. However, a unique address for all mobile stations may be provided to call all mobile stations simultaneously. Mobile station 1 compares the transmitted address with its address, and finding them the same, transmits a reply. On receiving this reply, the base station computer 10 would compare the mobile station reply with the information transmitted and if the signals transmitted and received are proper, the computer 10 would operate its audio switcher and connect the user to mobile station 1. The computer 10 may also make a record of the call or operation. A similar operation may be provided by the control 10 in the mobile station. We have shown separate switches 17, 18 for the mobile station, but they perform essentially the same function as the audio switcher in the computer 10. The audio switcher in the computer 10 may be a more complicated device, since it may switch a number of incoming lines to a number of outgoing base station transmitters and receivers such as shown in FIG. 1.

The computer or control 10 is the element where functions and commands are initiated and manifested. This includes an inquiry from the base station to the mobile station; comparisons of addresses and commands; establishment of a communication channel, on either the data designated channel or on another channel, between the base station and a mobile station or between mobile stations; and any other functions which might be desired in a customer-subscriber arrangement. Hence the number of functions desired determine the capabilities which the computer or control 10 must provide. It is for this reason that we have simply designated the input and outputs to the computer or control as a function in or a function out. Such functions can be of almost any type, depending upon the application or purpose of the radio communication system. Such techniques are well known to persons skilled in the art, and need not be described.

DETAILED DESCRIPTION — MODEM

At this point, it is appropriate to describe the binary bits or pulses which we prefer to be used in our function control apparatus. The pulses are shown in the waveforms of FIG. 6 which are plotted along a common time axis. In FIG. 6 (a), we have shown what we consider binary pulses, that is pulses which alternate between two values designated a logic 0 and a logic 1. It is immaterial whether the upper value is considered a logic 1 and the lower values a logic 0, or whether the upper value is considered a logic 0 and the lower value is considered a logic 1. We have assumed that the upper value is a binary logic 1, and the lower value is a binary logic 0. The pulses shown in FIG. 6 (a) represent a typical train of binary pulses which would be produced by the computer or control 10 and the encoder 11. Such pulses are not desirable when they have to be transmitted over a radio or other paths which cannot easily transmit direct current. Accordingly, the binary pulses of FIG. 6 (a) are converted to what we call diphase pulses as shown in FIG. 6 (b). Corresponding binary and diphase pulses are respectively above and below each other. The diphase pulses carry the same information, but have a voltage transition at the end of each binary pulse, and a voltage transition in the middle of either a binary logic 0 or a binary logic 1. In FIG. 6 (b), we have assumed that the middle transition is provided for a binary logic 1. Hence, it will be seen that the diphase pulses have a transition, either up or down, at the end of each binary pulse, and also have a transition, either up or down, at approximately the middle of each logic 1 binary pulse. These added transitions provide more alternating current components, and are readily adaptable to being transmitted by radio paths or communication paths which are intended to carry alternating current signals. Conversion from binary to diphase pulses and from diphase to binary pulses is a known technique. FIGS. 6(c) and 6(d) will be discussed subsequently.

With respect to FIG. 2, we have assumed that the base station is constantly transmitting outbound messages and is or may be constantly receiving inbound messages. Accordingly, the base station of FIG. 2 has a transmitting modem 12 and a receiving modem 13. On the other hand, we have assumed that the mobile station is either transmitting or receiving, so that the common modem 16 may be provided for the mobile station as shown in FIG. 3. The following description covers the transmitting and receiving modems. It should be pointed out that at a given station, the modems may be combined or may be separate, depending upon the circumstances and needs at that station.

FIG. 7 shows a block diagram of the transmit modem 12 used in the base station. This modem receives binary pulses, such as shown in FIG. 6(a), from the encoder 11, and these pulses are applied to a binary to diphase converter 30. The converter 30 transforms the binary pulses to diphase pulses as shown in FIG. 6(b). This transformation is made by any of the known converter circuits, utilizing clock pulses at the 1111 bits per second or C1111 rate. As used in this application, clock pulses are indicated by the prefix C followed by a number which indicates the frequency. Thus, C400,000 indicates clock pulses at the rate of 400,000 pulses per second. The C400,000 clock pulses are provided by the clock 15 in the base station, and these pulses are divided by a 360 divider 31 to produce the C1111 pulses.

Figure 8:
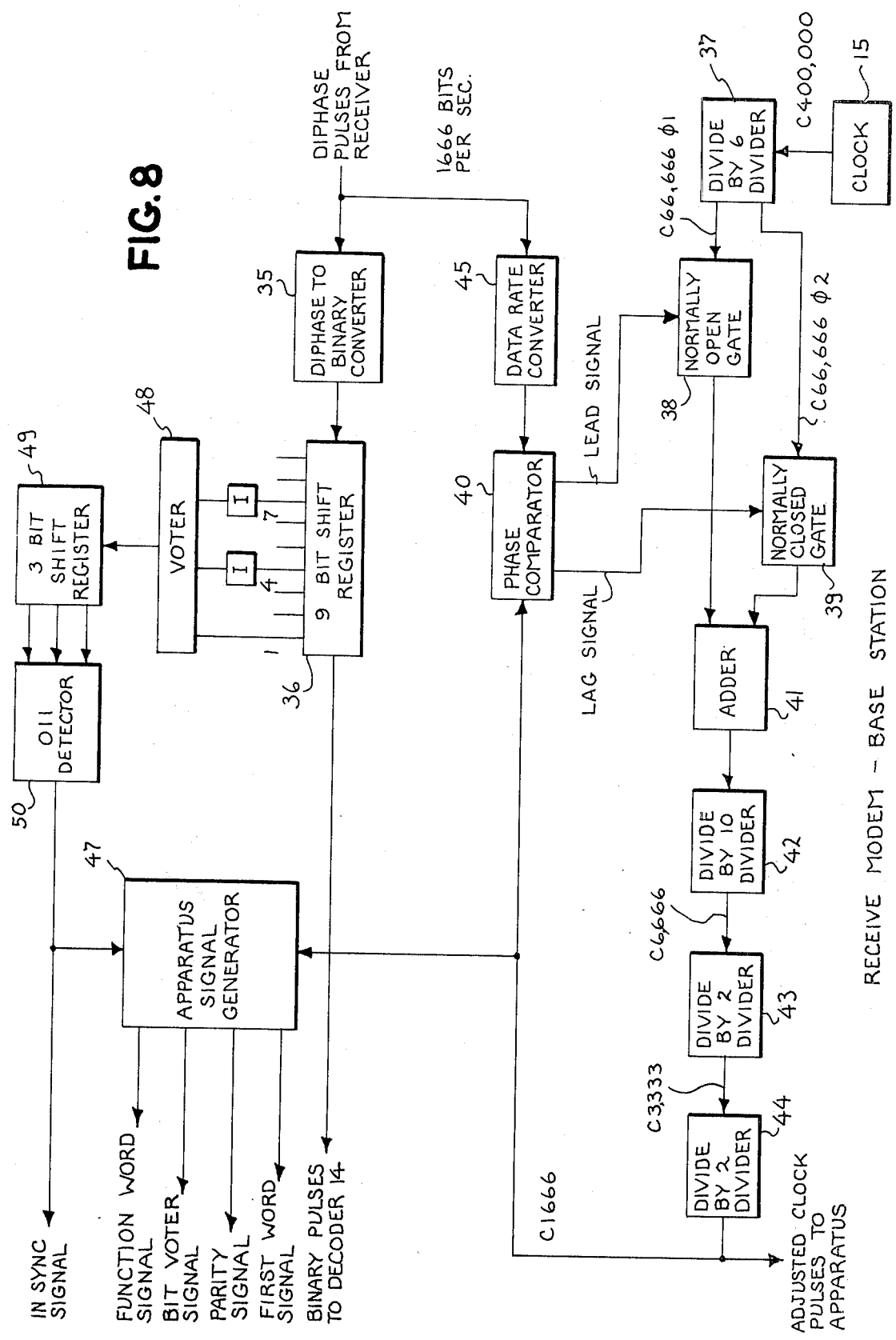
FIG. 8 shows a more detailed schematic block diagram of the receive modem of our function control apparatus of FIG. 2.

FIG. 8 shows a block diagram of the receive modem 13 for the base station. FIG. 8 includes more blocks or components, because this modem 13 provides synchronizing signals and adjusted clock signals. Its primary function however, is to convert diphase pulses, such as shown in FIG. 6(b), to binary pulses, such as shown in FIG. 6(a), for use in the base station decoder 14. The received diphase pulses are converted to binary pulses by a converter 35 which may be of a known type or one to be described hereinafter. The binary pulses are applied to a nine bit shift register 36 which is used in voting on the pulses in the SYN word to provide an indication that the base station apparatus is synchronized with the inbound message from the mobile station.

A primary requisite for this synchronization is that a stable frequency having the same bit rate and phase as the incoming diphase pulses be supplied to the base station function control apparatus. This frequency is achieved by means of the clock 15 which supplies the C400,000 pulses. These pulses are divided and converted to two sets of pulses preferably having a 180° phase relation, by means of a divide by six divider 37 which provides C66666φ1 and C66666φ2 pulses, where φ1 and φ2 may indicate 0° and 180° phases respectively. These pulses are respectively applied to a normally open gate 38 and a normally closed gate 39. The normally open gate 38 may be closed by a lead signal produced by a phase comparator 40, and the normally closed gate 39 may be opened by a lag signal produced by the phase comparator 40. The C66666φ1 and C66666φ2 pulses passed by the gates 38, 39 are combined sequentially in an adder 41 and then divided by a divide by 10 divider 42 to produce a sequence of C6666 pulses. These pulses are further divided by dividers 43, 44 to supply adjusted clock pulses C1666. These adjusted clock pulses are utilized in the decoder and other parts of the base station receive apparatus and are also applied to one input of the phase comparator 40. The received diphase pulses at the nominal 1666 bits per second rate are applied to a data rate converter 45 which may take a number of known forms. The converter 45 senses the data rate of the diphase pulses of FIG. 6(b), and omits the intermediate logic 1 transitions. The output of the converter 45 for the applied diphase pulses is shown in FIG. 6(c). This output is applied to the other input of the phase comparator 40 which compares the phase of the adjusted clock pulses C1666 with the phase of the received data rate pulses. If the phase of the adjusted clock pulses C1666 lags the phase of the data rate pulses, as shown in the left portion of FIG. 6(d), then the phase comparator 40 produces a lag signal that opens the gate 39 to add some C66666φ2 pulses to the pulse train. These added pulses, when divided, result in the adjusted clock signal coinciding in phase with the data rate pulses as indicated at the time T1 in FIGS. 6(b), 6(c), and 6(d). Conversely, if the phase of the adjusted clock pulses leads the phase of the data rate pulses, as shown at the right portion of FIG. 6(d), the phase comparator 40 produces a lead signal which closes the normally open gate 38 to block some C66666φ1 pulses. This reduces the number of pulses in the train. After these pulses are divided, the phase of the adjusted clock pulses coincides with the phase of the data rate pulses as indicated at the time T2 in FIGS. 6(b), 6(c), and 6(d). Thus, the reliable and stable pulses supplied by the clock 15 have their leading edge or phase adjusted so that they coincide with the incoming diphase pulses from the receiver. These adjusted clock pulses are utilized in various parts of the apparatus, particularly the decoder 14 and an apparatus signal generator 47.

As mentioned previously, the base station function control apparatus must synchronize with an inbound message very quickly, as typically the inbound message may not be repeated until a considerable number of intervening inbound messages have been sent to the base station by other mobile stations. It is for this reason that we have provided the 24 bit preamble to each inbound message as shown in FIG. 5 to assist the base station in achieving bit synchronization. Generally, the base station will have some internal timing circuit or device that alerts the base station to the time it should be receiving a preamble from a given mobile station in response to the predetermined outbound message to the given mobile station. At the proper time, the base station begins looking for this preamble from the given mobile station. When received, the preamble and message bits of an inbound message are passed through the nine bit shift register 36. Each first bit output, each inverted fourth bit output, and each inverted seventh bit output of the shift register 36 are applied to a voter circuit 48. Thus, the voter circuit 48 determines the binary value of each bit in each group of three equally spaced bits, and produces a binary value representing the majority binary value of those bits. For example, if two or more of the three bits in a group are a logic 1, the voter circuit 48 applies a logic 1 to a three bit shift register 49. If two or more of the three bits in a group are a logic zero, the voter circuit 48 applies a logic zero to the three bit shift register 49. The following table and explanation will explain how the base station operates on the first synchronizing word SYN to put the base station function control apparatus in synchronization with the inbound message:

TABLE 1

| | Synchronizing Code Bits: | | | | | | | | Majority Vote |
|---|---|---|---|---|---|---|---|---|---|
| | 1 | 2 | 3 | 4 | 5 | 6 | 7 | 8 | 9 | |
| (1) | 0 | 1 | 1 | 1 INV. | 0 | 0 | 1 INV. | 0 | 0 | |
| (2) | 0 | | | 0 | | | 0 | | | 0 |
| (3) | 1 | 1 | 1 | 0 INV. | 0 | 1 | 0 INV. | 0 | X | |
| (4) | 1 | | | 1 | | | 1 | | | 1 |
| (5) | 1 | 1 | 0 | 0 INV. | 1 | 0 | 0 INV. | X | Y | |
| (6) | 1 | | | 1 | | | 1 | | | 1 |

Figure 8A:
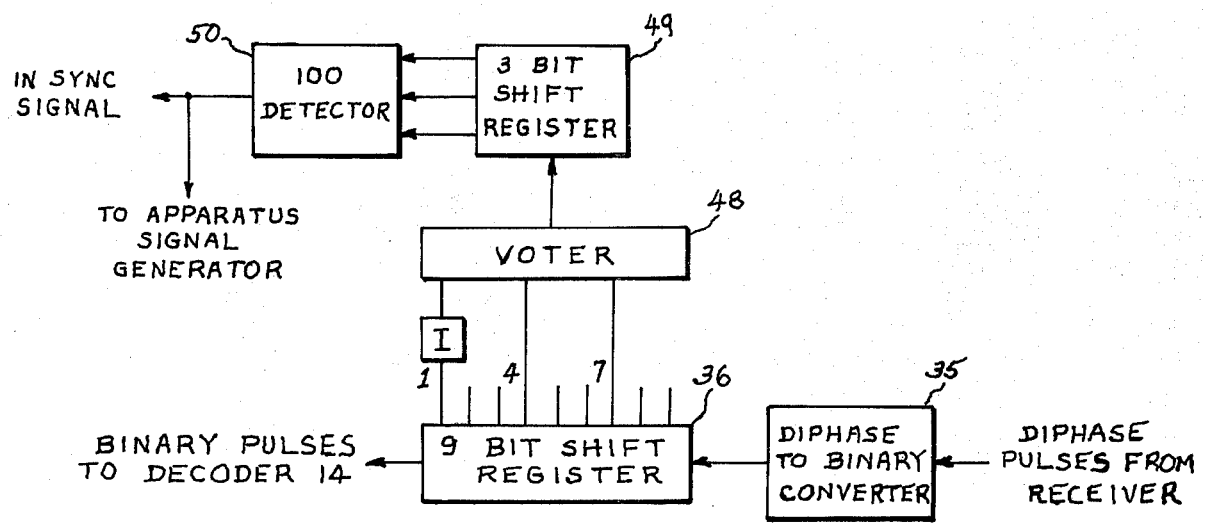
FIG. 8a shows a modification of a portion of the receive modem of our function control apparatus of FIG. 8.

As the sequence of bits from the converter 35 passes through the shift register 36 at the C1666 pulse rate, the first, fourth, and seventh bits of the shift register output are considered and voted on. In line 1 of Table 1, we have assumed that our nine bit synchronizing code 011100100 is completely entered in the shift register 36. In this condition, the first bit of the synchronizing code is at the first shift register output, the fourth bit of the synchronizing code is at the fourth shift register output, and the seventh bit of the synchronizing code is at the seventh shift register output. After the fourth and seventh bits are inverted, line 2 shows the logic on which the voter 48 votes. As indicated, all three bits are at a logic 0 so that the voter produces a logic 0. In line 3, another bit X has been received by the register so that the first bit (a 0) of the code is shifted out. At this time, the second, fifth, and eighth bits of the code word are at the first, fourth, and seventh shift register outputs, so that these outputs are at logic 1, 0 and 0 respectively. After inversion, the voter 48 sees the bits shown in line 4, all of which are a logic 1 so that the voter 48 produces a logic 1. In line 5, another bit Y is received and the second bit (a 1) of the code is shifted out. At this time, the third, sixth, and ninth bits of the code word are at the shift register output, so that after inversion, as shown in line 6, the voter 48 sees three logic 1's so that the voter 48 produces a logic 1. The right hand column of Table 1 shows that the majority vote is 011, based on the best two out of three bits for each vote. In summary, we provide an IN SYNC signal if a majority voted sequence of 011 is received after the preamble. This sequence is highly unique, so that the chances of an error are reduced considerably by our nine bit synchronizing word 011100100. Voting of the first, fourth, and seventh bit outputs is a continuous operation, but the uniqueness of the synchronizing word and the majority voting insure synchronizing on almost all inbound messages. The voted bits are applied to a three bit shift register 49. When the three bit shift register 49 shows an 011 at its outputs, an 011 detector 50 produces an appropriate in-synchronization signal, designated IN SYNC in FIG. 8. This synchronizing signal indicates that a command word will begin with the next bit received after the synchronizing code. The signal is applied to the apparatus signal generator 47 along with the adjusted clock so as to provide appropriate signals for use in the base station function control apparatus. It will be appreciated that in the voting process just described, the first register output may be inverted and the fourth and seventh register outputs left normal, as shown in FIG. 8a. In this case, an IN SYNC signal would be produced if a majority voted sequence of 100 is received. If the synchronizing word is 001001110, the majority voted sequence would be 001 for an inverted seventh register output or would be 110 for inverted first and fourth register outputs. In the above description, we refer to one or more of the first, fourth, and seventh shift register 36 outputs being inverted. The net result of this is that the first, second, and third code bits appear inverted if the first shift register output is inverted, and the fourth through ninth code bits appear inverted if the fourth and seventh shift register outputs are inverted. And in this and other discussions, the use of logic 1 and logic 0 simply means any two binary levels, such as plus and zero voltages, zero and minus voltages, or plus and minus voltages.

From the message in-synchronization signal, and with reference to the format of FIG. 5, the generator 47 produces a function word signal at the beginning of each of the address words and the response word, a bit voter signal to indicate to the decoder 14 that three corresponding bits of a repeated word are present and should be voted on, a parity signal to indicate that the four parity bits in a 12 bit word have been received and corrections should be made, and a first word signal to indicate the first of the three repeated address or response words.

In the description of the receive modem 13 of FIG. 8, we have used terminology and designations which, we feel, aid in understanding the modem 13. Persons skilled in the art will appreciate that other logic or operating functions can be substituted. For example, the shift register 36 actually only needs to be able to store six bits, as the seventh bit can be voted on as it is received from the converter 35. Similarly, other divide circuits could be used in order to achieve the desired bit rate. And, of course, other bit rates may be utilized.

In the mobile station, the modem is generally similar except for the fact that a mobile station is usually receiving outbound messages constantly one after another, whether they are designated for that given mobile station or not. These outbound messages provide more opportunities for the mobile station to synchronize its function control apparatus with the base station pulses or bits and messages. Another difference is the fact that the mobile station receives pulses at the outbound message rate of 1111 bits per second, and transmits pulses back at the inbound message rate of 1666 bits per second, which is 1½ times as fast. Finally, the modem for the mobile station may combine the transmitting and receiving portions, since generally the mobile station is either transmitting or receiving, but not both transmitting and receiving as in the case of a base station.

Figure 9:
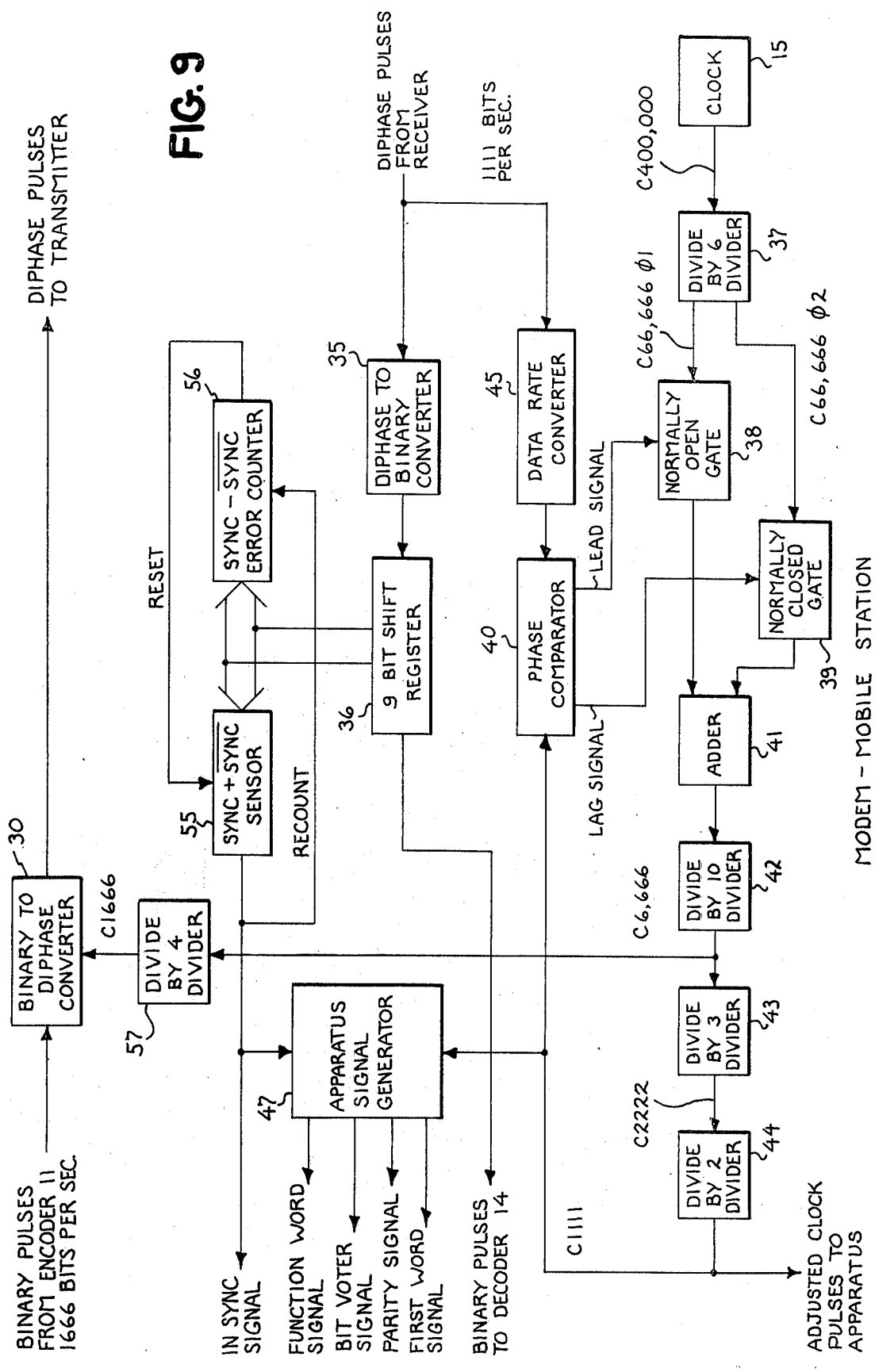
FIG. 9 shows a more detailed schematic block diagram of the transmit and receive modem of our function control apparatus of FIG. 3.

FIG. 9 shows a block diagram of the modem 16 for a mobile station. Parts corresponding to those of FIG. 8 have been given the same reference numerals. In the lower part of FIG. 9, the clock signals are divided and pulses added or deleted by the gates 38, 39 depending upon the phase relation of the clock and diphase pulses applied to the phase comparator 40. The diphase pulses are also applied to the converter 35 and the nine bit shift register 36. The binary pulses so produced are applied to the mobile station decoder 14. The mobile station can synchronize its function control apparatus with outbound messages more reliably, as it may be constantly receiving outbound messages even though not addressed to it. A synchronizing and inverted synchronizing word sensor 55 looks at each nine bits in the register 36. If the proper synchronizing word 011100100 is received followed by the proper inverted synchronizing word 100011011, the sensor 55 produces an insynchronization (IN SYNC) signal for use in the function control apparatus and in the apparatus signal generator 47. The apparatus produces this insynchronization signal until an error counter 56 receives and counts a total of five consecutive errors in synchronizing words or inverted synchronizing words. We prefer five consecutive errors, because of the nature of the communication medium. It is quite possible that several synchronizing errors could be received without the function control apparatus getting out of synchronization. If a correct synchronizing word or a correct inverted synchronizing word is received before five consecutive errors are counted, the sensor 55 produces a recount signal which sets the counter 56 back to zero so that the error count is started over again. However, if the counter 56 does count five consecutive synchronizing errors, it provides a reset signal to the sensor 55, which causes the sensor 55 to produce an out-of-synchronization signal (or remove the insynchronization signal) until a correct synchronizing word followed by a correct inverted synchronizing word are received. As mentioned before, the synchronizing code may have the bit values 001001110 and inverted bit values 110110001.

In the transmitting direction, the binary pulses from the encoder 11 at the 1½ times or 1666 bits per second rate are applied to the converter 30 which is the same as the converter 30 of FIG. 7. This converter 30 receives adjusted clock pulses C3333, since the mobile station clock is adjusted in accordance with outbound messages. These pulses are derived from the divide by 10 divider 42 and applied to a divide by 4 divider 57 to produce C1666 clock pulses for the converter 30.

DETAILED DESCRIPTION — MODEM DIPHASE TO BINARY CONVERTER

Figure 10:
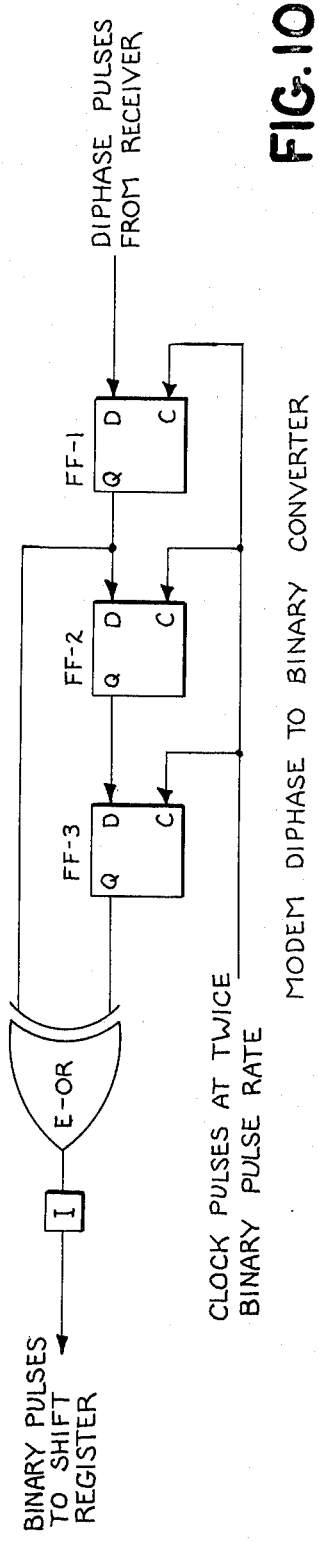
FIG. 10 shows a more detailed schematic block diagram of a diphase to binary converter in accordance with our invention that can be used in the modems of FIGS. 8 and 9.

While there are known diphase to binary converters which can be used for the converters 35 in FIG. 8 and FIG. 9, we have provided a converter which, we believe, improves the message acceptance rate when a data format such as previously described is used. When binary or digital pulses are transmitted over radio paths, resultant errors are primarily due to multipath fading of the radio frequency signal. When, as in our function control apparatus, majority voting of repeated pulses is used to improve the accuracy of such received pulses, any arrangement which produces a negative or zero correlation of errors will enhance the accuracy of the voted bits. Normally the occurrence of multipath fades is predictable; therefore the errors follow a predictable or correlated pattern. Our diphase to binary converter will produce either zero or two binary errors for each diphase error. The probability that a double binary error will occur when a diphase error occurs is 0.5. Hence, the total number of bit errors due to multipath fading is the same as a diphase to binary converter with a one-to-one error correspondence, but the number of voted errors is less since the errors are not correlated. The converter shown in FIG. 10 produces a negative or zero correlation of errors and thus improves the voted bit probability. In FIG. 10 we have provided three D type flip-flops FF1, FF2, FF3. These flip-flops are of the bistable type and are triggered or clocked at their clock input C by pulses which have a rate twice the binary pulse rate. The diphase pulses from the receiver are applied to the D input of the first fip-flop FF1. The Q output of the first flip-flop FF1 is applied to the D input of the second flip-flop FF2, and the Q output of the second flip-flop FF2 is applied to the D input of the third flip-flop FF3. The Q outputs of the first and third flip-flops FF1, FF3 are applied to the two inputs of an exclusive OR gate EOR, and the output of this gate EOR is inverted. This inverted output is applied to the shift register 36 in FIG. 8 or FIG. 9. As known in the art, an exclusive OR gate produces a logic 0 when its inputs have the same logic level, that is all inputs are at logic 0 or all inputs are at a logic 1. An exclusive OR gate produces a logic 1 output when its inputs are at different logic levels. The combination of the exclusive OR gate EOR and the inverter results in a logic 1 being produced when both inputs to the exclusive OR gate EOR are at the same logic level, and a logic 0 being produced when both inputs to the exclusive OR gate EOR are at different logic levels.

It will be seen that the flip-flops FF1 through FF3 provide a way to shift the phase or time delay diphase pulses so that two signals identical to the diphase input can be produced that have a 360° (or one binary bit) phase relation. The exclusive OR gate EOR provides a way to produce one binary logic output when the two inputs are different, and to produce the other binary logic output when the two inputs are the same. This can be shown by the following truth table:

| FF1 Q | FF3 Q | 1 OUTPUT |
|---|---|---|
| 0 | 0 | 1 |
| 1 | 0 | 0 |
| 1 | 1 | 1 |
| 0 | 1 | 0 |

Figure 11:
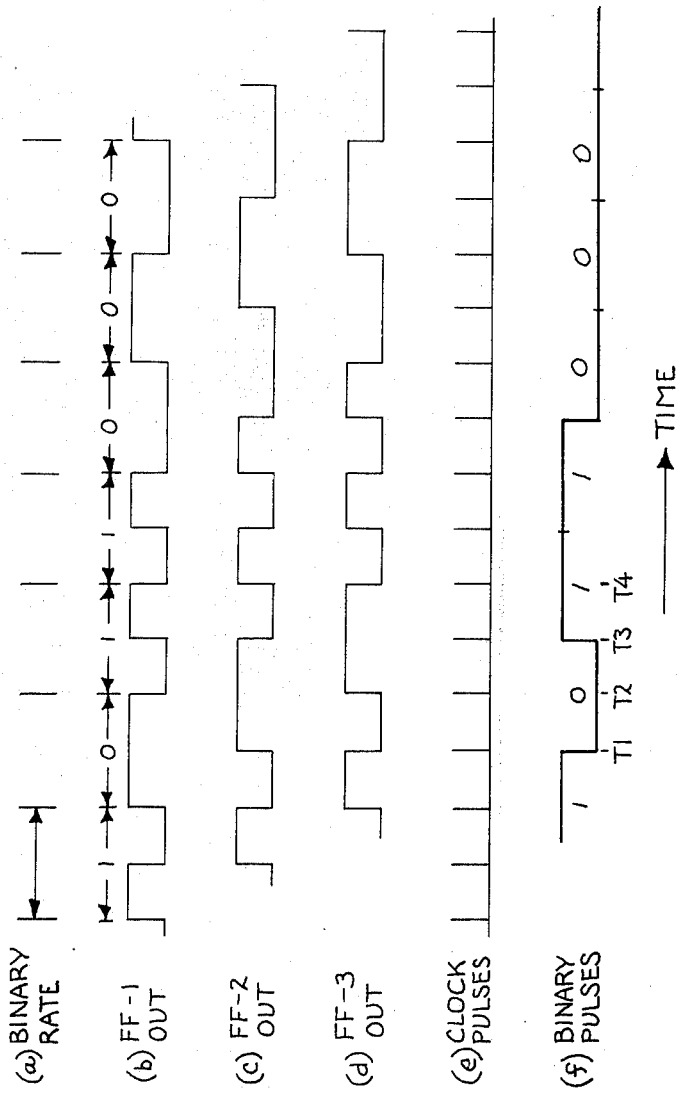
FIGS. 11a through 11f show wave forms for illustrating the operation of the converter of FIG. 10.

The following explanation of our converter of FIG. 10 is given with the waveforms shown in FIG. 11. FIG. 11(a) shows the binary pulse rate, and this can be any rate, such as 1111 bits per second or 1666 bits per second, as mentioned earlier. The outputs of the three flip-flops FF1, FF2, FF3 are shown in FIGS. 11(b), 11(c), and 11(d), and it will be seen that each flip-flop introduces a 180° time delay between its input and output pulses. Thus, the output of the flip-flop FF3 is 360° or one binary time period delayed with respect to the output of the flip-flop FF1. FIG. 11(e) shows the applied clock pulses, which are at twice the binary pulse rate. The inputs to the exclusive OR gate EOR are derived from the outputs of the first and third flip-flops FF1, FF3. Just before the time T1, it will be seen that both these outputs are at a logic 1, so that the exclusive OR gate EOR produces a logic 0 which is inverted by the inverter to a logic 1. This logic 1 is a binary pulse and is shown in FIG. 11(f) prior to the time T1. Immediately after the time T1, the flip-flop FF1 is still producing a logic 1 but the flip-flop FF3 is producing a logic 0, so that the exclusive OR gate produces a logic 1 which is inverted to a logic 0 as shown in FIG. 11(f). Immediately after the time T2, the flip-flop FF1 is producing a logic 0 but the flip-flop FF3 is producing a logic 1 so that the inverted output remains a logic 0. Immediately after the time T3, the flip-flop FF1 is producing a logic 1 and the flip-flop FF3 is producing a logic 1. Hence, the binary pulse of FIG. 11(f) switches to a logic 1. Immediately after the time T4, the flip-flop FF1 and the flip-flop FF3 are both producing a logic 0. The exclusive OR gate EOR produces a logic 0 which is inverted to a logic 1. Subsequent changes in the binary pulses are produced in a similar manner. Thus, the diphase input, such as represented in the waveform of FIG. 11(b), is converted to binary pulses as represented in the waveform of FIG. 11(f).

Although the converter circuit of FIG. 10 is relatively simple, we have found that when this converter is used in a voting arrangement such as we utilize in our function control apparatus, the accuracy of transmitted binary or digital data is greatly increased, particularly where the transmission path is noisy or is subject to fading, such as in the land mobile radio frequency spectrum.

DETAILED DESCRIPTION — ENCODER

Figure 12:
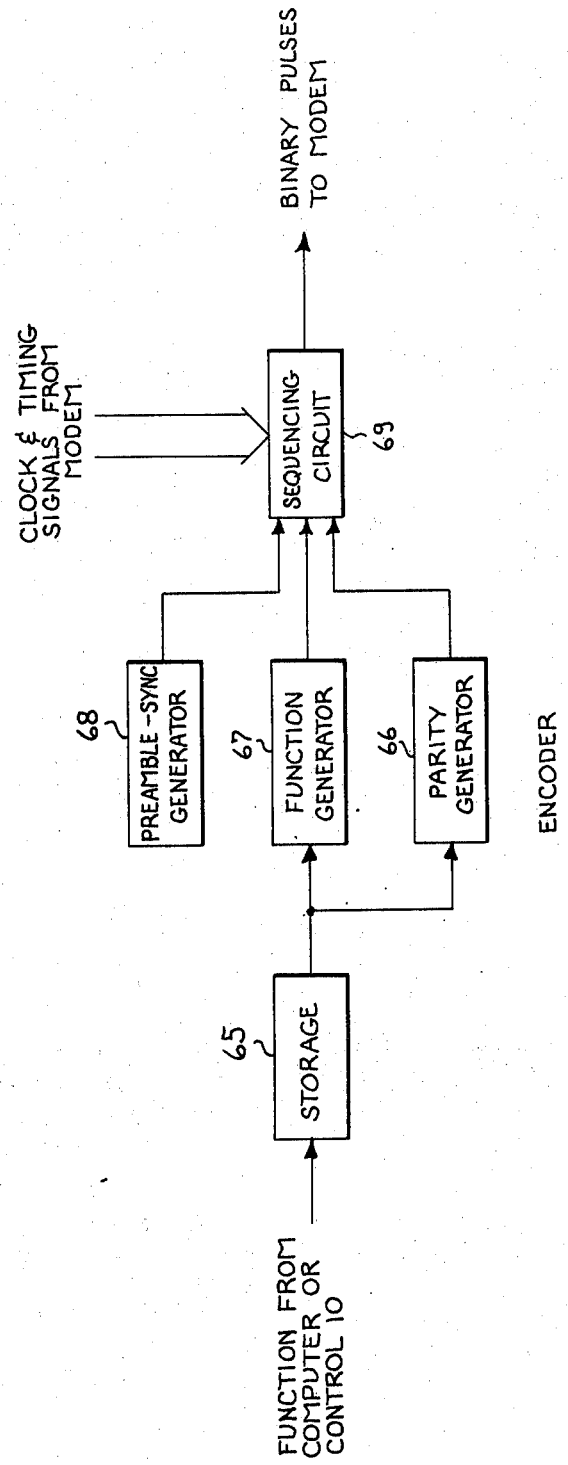
FIG. 12 shows a more detailed schematic block diagram of the encoder of our function control apparatus of FIGS. 2 and 3.

The encoder 11 for the base station is intended to receive words (address and command of eight bits each) from the computer 10 and generate an outbound message format such as shown in FIG. 4. Similarly, the encoder 11 for the mobile station receives words (address and response of eight bits each) from the control 10 and generates an inbound message format such as shown in FIG. 5. Such encoders may take a number of known forms which, generally, provide the necessary pulse and timing sequences to produce those formats. FIG. 12 shows a relatively simple diagram of such an encoder. Words from the computer or control 10 are applied to a suitable storage device 65 which retains each word for the needed length of time. A parity generator 66 is connected to the storage device 65 and generates, on the basis of the stored eight bit word, the necessary sequence of four parity bits to be supplied after the eight word bits. The storage device 65 also causes a function generator 67 to repeat the necessary sequence of eight word bits. Last, a preamble-synchronizing generator 68 generates the preamble bits for inbound messages, and generates the synchronizing and inverted synchronizing bits for both inbound and outbound messages. The outputs from the parity generator 66, the function generator 67, and the preamble-synchronizing generator 68 are combined in a sequencing circuit 69 in the proper sequence and under time control of either the base station clock which is absolute or under control of the mobile station clock which is corrected in accordance with outbound messages. Of course, the time control provides the proper rate, namely 1111 pulses per second for outbound messages, and 1666 bits per second for inbound messages. The sequencing circuit 69 also provides the necessary repetition of the function words, namely address 1, address 1', and command or response 1. The pulse sequence so produced is applied to the modem for transmission.

DETAILED DESCRIPTION — DECODER

Figure 13:
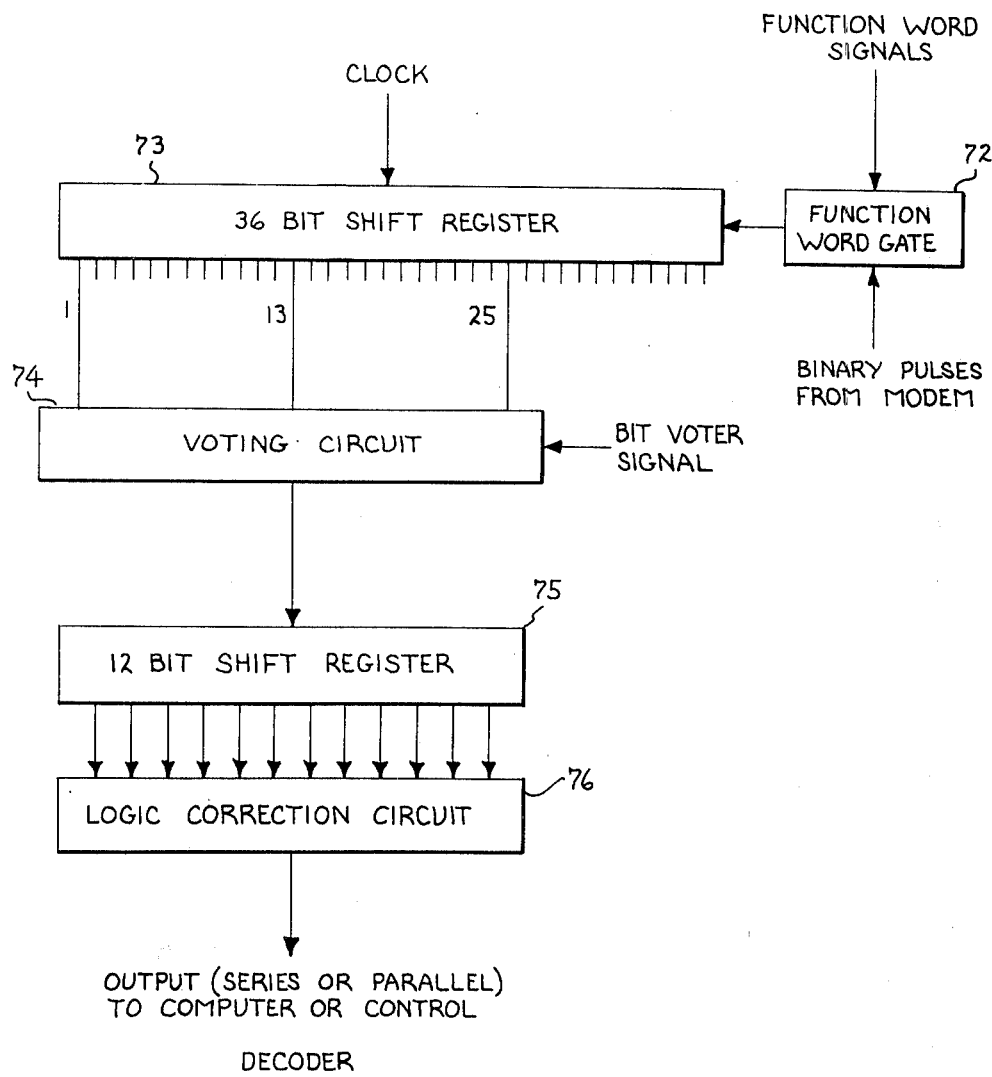
FIG. 13 shows a more detailed schematic block diagram of the decoder of our function control apparatus of FIGS. 2 and 3.

A diagram of a decoder 14 which can be used with the base station of FIG. 8 or the mobile station of FIG. 9 is shown in FIG. 13. This decoder receives the binary pulses from the modem shift register 36 at a function word gate 72 which permits only the function words to pass from the shaft register to a 36 bit shift register 73. At the base station, the gate 72 blocks the preamble bits. At both the base and mobile stations, the gate 72 blocks the synchronizing bits. Pulses passed by the gate 72 are applied to a 36 bit shift register 73. The shift register 73 need not actually hold 36 bits, but is being described as a 36 bit register in order to simplify the explanation. Corresponding bits of each 12 bit word of a function address or command are voted on by a voting circuit 74. This voting is provided by deriving bits 1, 13 and 25 from the shift register 73, so that as the bits are shifted into and through the register 73, the corresponding bits (separated by 12 intermediate bits) are voted on. The voter 74 votes the majority, namely 2 out of 3, of the bits present at the 1, 13 and 25 outputs of the register 73, and supplies the majority voted bit to another 12 bit shift register 75. The register 75 stores the voted 12 bits, in order that a logic correction circuit 76 can consider the eight message bits in relation to the four parity bits, and do whatever bit correction may be necessary. After this correction is made, the four parity bits may be stripped off or eliminated, and the eight message bits can be provided either in parallel or in series to the computer or control 10. If the correct address is received by the computer or control 10, then the computer or control 10 provides the necessary function, whatever it may be as determined by the command portion of the message. At the mobile station, this may include transmitting back the given mobile station's address along with the response to the command. However, other features or functions may be provided if desired.

As mentioned, the shift register 73 actually need not store 36 bits, but may only store 24 bits, in which case the first and thirteenth bits are compared and voted on along with the incoming bit which would be the twenty-fifth bit. This would eliminate one set of 12 bit registers. However, this is a matter that is obvious to a person of ordinary skill, so that various arrangements may be utilized.

CONCLUSION

It will thus be seen that we have provided a new and improved function control apparatus which is particularly useful and adaptable to radio communication systems. Our apparatus provides all of the speed and versatility of modern binary digital techniques, but is also reliable and accurate, even though it is used in the relatively noisy and harsh radio communication environment. While we have shown specific embodiments, persons skilled in the digital and logic art will appreciate that modifications may be made to various combinations or all of our invention. Therefore, it is to be understood that modifications may be made to the embodiments shown without departing from the spirit of the invention or from the scope of the claims.

What we claim as new and desire to secure by Letters Patent of the U.S. is:

1. For use in a radio communication system having at least a base station transmitter and receiver at one location and a mobile station transmitter and receiver at a second location, function control apparatus for establishing communication between said stations comprising:
  a. means for for producing outbound messages having a sequence of binary bits at a first rate, each outbound message comprising a first synchronizing word of S bits, where S is an integer greater than two, a first address word, a second synchronizing word of S bits that is the binary inversion of said first synchronizing word, a second address word, a third synchronizing word of S bits that is the binary inversion of said first synchronizing word, and a command word;
  b. means connected to said outbound message producing means and for connection to said base station transmitter for supplying said outbound messages thereto;
  c. means for connection to said mobile station receiver for deriving said outbound messages transmitted by said base station transmitter and received by said mobile station receiver;
  d. synchronizing means connected to said deriving means of said mobile station receiver for producing an in-synchronization signal in response to said first synchronizing word and said second synchronizing word of said received outbound messages each having a respective predetermined sequence of binary values and for producing an out-of-synchronization signal in response to a predetermined plurality of sequential synchronizing words of said received outbound messages each having a sequence of binary values that is different from its respective predetermined sequence of binary values;
  e. means connected to said synchronizing means of said mobile station and connected to said deriving means of said mobile station for producing an inbound message in response to said in-synchronization signal and in response to said first and second address words of an outbound message having a predetermined sequence of binary values, said inbound message having a sequence of binary bits at a second rate that is greater than said first rate of said binary bits of said outbound messages, each inbound message comprising a synchronizing preamble, said first synchronizing word of S bits, said first address word, said second synchronizing word of S bits, said second address word, said third synchronizing word of S bits, and a response word;

f. means connected to said inbound message producing means and for connection to said mobile station transmitter for applying said inbound message thereto;

g. means for connection to said base station receiver for deriving an inbound message transmitted by said mobile station transmitter and received by said base station receiver;

h. synchronizing means connected to said deriving means of said base station for determining the binary values of each group of N equally spaced bits in said synchronizing words of said inbound message, where N is an integer greater than two, and S/N is an integer greater than one; producing a bit representing the majority binary value of said N bits of each of said groups; and producing an in-synchronization signal in response to said representative bits having a predetermined sequence of binary values;

i. and utilizing means connected to said synchronizing means of said base station for utilizing said derived inbound message in response to said in-synchronization signal produced by said synchronizing means of said base station.

2. The function control apparatus of claim 1 wherein S is nine and wherein N is three.

3. The function control apparatus of claim 1 wherein each of said first synchronizing words of all messages comprises nine bits having the binary values 011100100, and wherein there are three groups comprising the first, fourth, and seventh bits, the second, fifth, and eighth bits, and the third, sixth, and ninth bits respectively.

4. The function control apparatus of claim 3 wherein the binary values of each group are determined by the first through third bits and the fourth through ninth bits being logically inverted relative to each other.

5. The function control apparatus of claim 4 wherein said second bit rate is one and one-half times said first bit rate.

6. In a communication system having at least one command station transmitter and receiver and a plurality of controlled stations, each having a transmitter and receiver, apparatus for establishing communication between said command station and one of said controlled stations comprising:

a. first means for connection to said command station transmitter for applying binary outbound messages thereto, each of said outbound messages comprising a first synchronizing word of nine bits, a first address word, a second synchronizing word of nine bits that is the logic inversion of said first synchronizing word, a second address word, a third synchronizing word of nine bits that is the logic inversion of said first synchronizing word, and a command word in that order;

b. second means for connection to said one controlled station receiver for deriving said outbound messages received thereby;

c. third means connected to said second means for indicating proper receipt of at least said first and second synchronizing words and producing an in-synchronization signal;

d. fourth means connected to said second and third means for producing a binary inbound message in response to an in-synchronization signal and in response to said first and second address words of said outbound message being designated for said one controlled station, said binary inbound message comprising a preamble, said first synchronizing word, said first address word, said second synchronizing word, said second address word, said third synchronizing word, and a response word in that order, the binary rate of said inbound message being greater than the binary rate of said outbound message;

e. fifth means for connecting said fourth means to said controlled station transmitter for applying said inbound message thereto;

f. sixth means for connection to said command station receiver for deriving said inbound message received thereby;

g. seventh means connected to said sixth means for voting on the logic majority of a group formed of every first, fourth and seventh bits, a group formed of every second, fifth and eighth bits, and a group formed of every third, sixth, and ninth bits forming said synchronizing words;

h. eighth means connected to said seventh means for producing an in-synchronization signal in response to the logic majority of said three groups having a predetermined code;

i. and ninth means connected to said sixth means and to said eighth means for utilizing said inbound message in response to said in-synchronization signal.

7. The function control apparatus of claim 6 wherein each of said first synchronizing words of all messages comprises the binary values 011100100.

8. The function control apparatus of claim 7 wherein said seventh means votes on the binary values of said first through third bits and said fourth through ninth bits being logically inverted relative to each other.

9. The function control apparatus of claim 8 wherein said binary rate of said inbound message is one and one-half times said binary rate of said outbound message.

10. For use in a radio communication system having at least a transmitter at one location that transmits a synchronizing word of nine binary bits in a sequence, and a receiver at a second location for receiving said synchronizing word, apparatus for indicating that said receiver is synchronized with said transmitter comprising:

a. first means for connection to said receiver for deriving as a group every first, fourth, and seventh bit as said sequence of bits received by said receiver progresses through said first means;

b. second means connected to said first means for inverting the binary value of said derived fourth bit;

c. third means connected to said first means for inverting the binary value of said derived seventh bit;

d. voting means connected to said first, second, and third means for determining the majority binary value of each group comprising said first derived bit, said inverted fourth derived bit, and said inverted seventh derived bit;

e. storage means connected to said voting means for storing each determined majority binary value;

f. and indicating means connected to said storage means for indicating that the stored binary values have a predetermined code.

11. The indicating apparatus of claim 10 wherein said indicating means comprise means for indicating that three stored binary values have a predetermined code.

12. The indicating apparatus of claim 10 wherein said predetermined code is 011.

13. For use in a radio communication system having at least a transmitter at one location that transmits a synchronizing word of nine binary bits in a sequence, and a receiver at a second location for receiving said synchronizing word, apparatus for indicating that said receiver is synchronized with said transmitter comprising:

a. first means for connection to said receiver for deriving as a group every first, fourth, and seventh bit as said sequence of bits received by said receiver progresses through said first means;

b. second means connected to said first means for inverting the binary value of said derived first bit;

c. voting means connected to said first and second means for determining the majority binary value of each group comprising said inverted first derived bit, said fourth derived bit, and said seventh derived bit;

d. storage means connected to said voting means for storing each determined majority binary value;

e. and indicating means connected to said storage means for indicating that the stored binary values have a predetermined code.

14. The indicating apparatus of claim 13 wherein said indicating means comprise means for indicating that three stored binary values have a predetermined code.

15. The indicating apparatus of claim 13 wherein said predetermined code is 100.

16. For use in a radio communication system having at least a transmitter at one location that transmits a synchronizing word of nine bit values in a sequence, and a receiver at a second location for receiving said synchronizing word, apparatus for indicating that said receiver and said transmitter are in synchronization comprising:

a. first means for connection to said receiver for deriving at least one received synchronizing word therefrom;

b. second means connected to said first means for inverting the binary bit values of the fourth, fifth, sixth, seventh, eighth, and ninth bits of said synchronizing word as said sequence progresses through said first means;

c. third means connected to said first means and to said second means for producing a first signal representing the logic majority of a normal first, inverted fourth, and inverted seventh bits of said sequence; a second signal representing the logic majority of a normal second, inverted fifth, and inverted eighth bits of said sequence; a third signal representing the logic majority of a normal third, inverted sixth, and inverted ninth bits of said sequence;

d. and fourth means connected to said third means for producing an in-synchronization signal in response to said first, second, and third signals having predetermined values.

17. For use in a radio communication system having at least a transmitter at one location that transmits a synchronizing word of nine bit values in a sequence, and a receiver at a second location for receiving said synchronizing word, apparatus for indicating that said receiver and said transmitter are in synchronization comprising:

a. first means for connection to said receiver for deriving at least one received synchronizing word therefrom;

b. second means connected to said first means for inverting the binary bit values of the first, second, and third bits of said synchronizing word as said sequence progresses through said first means;

c. third means connected to said first means and to said second means for producing a first signal representing the logic majority of an inverted first, normal fourth, and normal seventh bits of said sequence; a second signal representing the logic majority of an inverted second, normal fifth, and normal eighth bits of said sequence; a third signal representing the logic majority of an inverted third, normal sixth, and normal ninth bits of said sequence;

d. and fourth means connected to said third means for producing an in-synchronization signal in response to said first, second, and third signals having predetermined values.

* * * * *

UNITED STATES PATENT OFFICE
CERTIFICATE OF CORRECTION

PATENT NO. : 4,001,693

DATED : January 4, 1977

INVENTOR(S) : B.L. Stackhouse, T.E. Taylor

It is certified that error appears in the above-identified patent and that said Letters Patent are hereby corrected as shown below:

Column 6, line 42, cancel "SYN" and insert -- $\overline{SYN}$ --

Column 6, line 45, cancel "SYN" and insert -- $\overline{SYN}$ --

Column 6, line 53, cancel "SYN" and insert -- $\overline{SYN}$ --

Column 6, line 58, cancel "SYN" and insert -- $\overline{SYN}$ --

Column 7, line 65, cancel "01110100" and insert -- 011100100 --

Column 8, line 54, cancel "SYN" and insert -- $\overline{SYN}$ --

Column 14, line 67, cancel "insyn-" and insert -- in-syn- --

Column 15, line 46, cancel "fip-flop" and insert -- flip-flop --

Signed and Sealed this

Third Day of May 1977

[SEAL]

Attest:

RUTH C. MASON
*Attesting Officer*

C. MARSHALL DANN
*Commissioner of Patents and Trademarks*